J. S. LORD.
RECLINING SEAT FOR AUTOMOBILES.
APPLICATION FILED JUNE 1, 1908.
927,566.
Patented July 13, 1909.
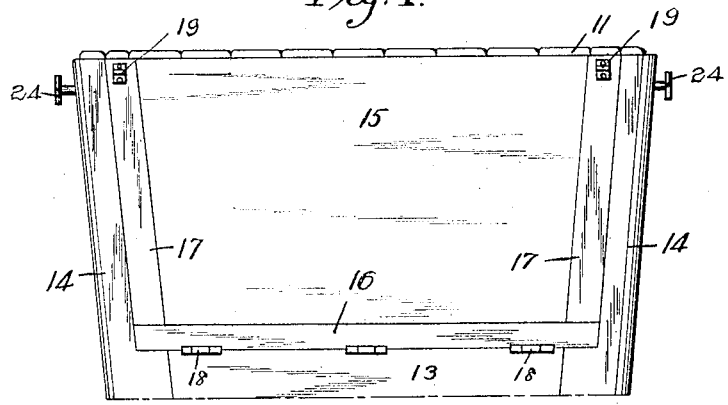
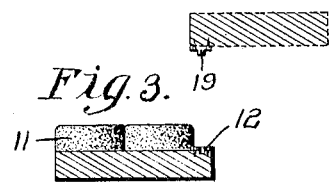
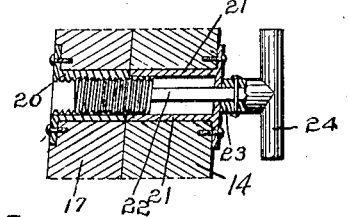
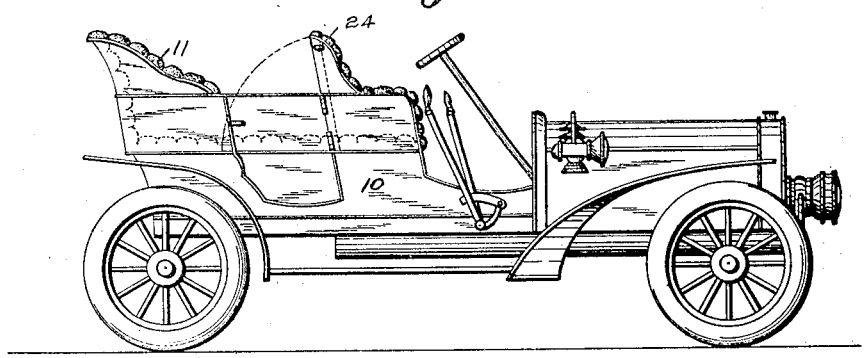
Witnesses.
F. C. Dahlberg
M. E. Bennett
Inventor.
J. S. Lord.
by Orwig & Lane Atty's

UNITED STATES PATENT OFFICE.

JOHN S. LORD, OF OGDEN, IOWA.

RECLINING-SEAT FOR AUTOMOBILES.

No. 927,566.  Specification of Letters Patent.  Patented July 13, 1909.

Application filed June 1, 1908. Serial No. 435,927.

*To all whom it may concern:*

Be it known that I, JOHN S. LORD, a citizen of the United States, residing at Ogden, in the county of Boone and State of Iowa, have invented a certain new and useful Reclining-Seat for Automobiles, of which the following is a specification.

The object of my invention is to provide a device of the class described of simple, durable and inexpensive construction so arranged that the back of the forward seat of an automobile or similar device may be readily, quickly and easily moved to a horizontal position in line with the front and rear seats and in the same plane to thereby provide a comfortable bed in which the occupants of the automobile may recline.

A further object is to provide a seat of this kind which when in its upright position for use as a seat will be firmly and securely held and also firmly and securely held when in its downwardly inclined position.

My invention consists in the construction, arrangement and combination of the various parts of the device, whereby the objects contemplated are attained, as hereinafter more fully set forth, pointed out in my claims and illustrated in the accompanying drawings, in which—

Figure 1 shows a rear elevation of the forward seat. Fig. 2 shows a detail, sectional view of the upper end of the reclining seat to illustrate the lug thereon. Fig. 3 shows a sectional view of the forward end of the rear seat to illustrate the socket for receiving said lug. Fig. 4 shows an enlarged, detail, sectional view illustrating the screw for holding the back of the seat in its upright position and for holding the parts of the seat frame together, and—Fig. 5 shows a side elevation of an automobile with my improvements applied thereto; the dotted lines show the position of the reclining back when in its position for use as a bed.

Referring to the accompanying drawings, I have used the reference numeral 10 to indicate the automobile body which is of ordinary shape.

11 indicates the rear seat which is also of ordinary shape. At the forward upper edge of the rear seat, I have provided a socket 12 for purposes hereinafter made clear.

The back of the front seat comprises a rigid frame having a bottom piece 13 and upright side pieces 14. The back of the reclining seat comprises a body portion 15 having a frame around it comprising a lower horizontal piece 16 and two uprights 17. The said bottom is connected by the hinges 18 with the bottom piece 13 so that it may freely swing from an upright position rearwardly to a horizontal position. On the rear upper corners of the uprights 17 are the lugs 19 designed to enter the sockets 12 when the back is in a horizontal position.

In order to firmly and securely hold the reclining back to the frame 14 when in its upright position, I have provided in the uprights 17 the sockets 20, screw-threaded on their inner sides, and in the uprights 14 are the sockets 21.

22 indicates a screw-threaded bolt having a shoulder at 23 and a handle 24, said bolt being designed to screw into the sockets 20 to thereby hold the back against rearward movement and at the same time to hold the uprights 14 firmly in position against the uprights 17 and to thereby prevent the sides 14 from spreading.

In practical use and assuming that the reclining back is in the position shown in Figs. 1 and 5, then obviously the front seat may be used in the ordinary manner and the back will be rigidly secured in position. Assuming that it is desired to use the automobile body as a bed, then the operator simply unscrews the bolts 22 until they are free from the uprights 17 whereupon the reclining back may be tilted rearwardly on the hinges 18 until the lugs 19 enter the sockets 12. This will firmly hold the reclining back in a horizontal position. The bottom of both the forward and rear seats and the front portion of the back 15 are upholstered so that when the back is in its horizontal position, a flat bed will be formed and the upholstering will form a cushion that will make a comfortable and easy bed.

In the event that it is desired to have the back in a horizontal position while the automobile is running, then the lugs 19 in the sockets 12 will prevent the back from spreading relative to the rear seat.

I claim as my invention.

1. In combination with a seat provided with a base and side members, of a back provided with a base hinged to the seat base, and side bars fitting between said side members, and conforming to the contour thereof, threaded sleeves secured within the side bars, sockets located in said side members and adapted to register with said threaded sleeves, and locking rods carried by said sockets and having threaded ends to engage the threads of said sleeves.

2. In combination with a seat provided with a base and side members, of a back provided with a base hinged to the seat base, and side bars fitting between said side members, and conforming to the contour thereof, threaded sleeves secured within the side bars, sockets located in said side members and adapted to register with said threaded sleeves, locking rods carried by said sockets and having threaded ends to engage the threads of said sleeves, a second seat in the rear of the first mentioned seat and provided with recesses, and lugs on said back adapted to engage said recesses.

Des Moines, Iowa, May 27, 1908.

JOHN S. LORD.

Witnesses:
RALPH ORWIG,
MILDRED B. GOLDIZEN.